Sept. 11, 1962     A. R. HUNTLEY ETAL     3,053,642
DISTRIBUTING GAS TO FLUIDIZED BEDS
Filed Aug. 5, 1958     3 Sheets-Sheet 1

Allan R. Huntley
Carl H. Huebschle    Inventors

By    Attorney

Sept. 11, 1962    A. R. HUNTLEY ETAL    3,053,642
DISTRIBUTING GAS TO FLUIDIZED BEDS Filed Aug. 5, 1958    3 Sheets—Sheet 2

Allan R. Huntley
Carl H. Huebschle     Inventors

By *[signature]*    Attorney

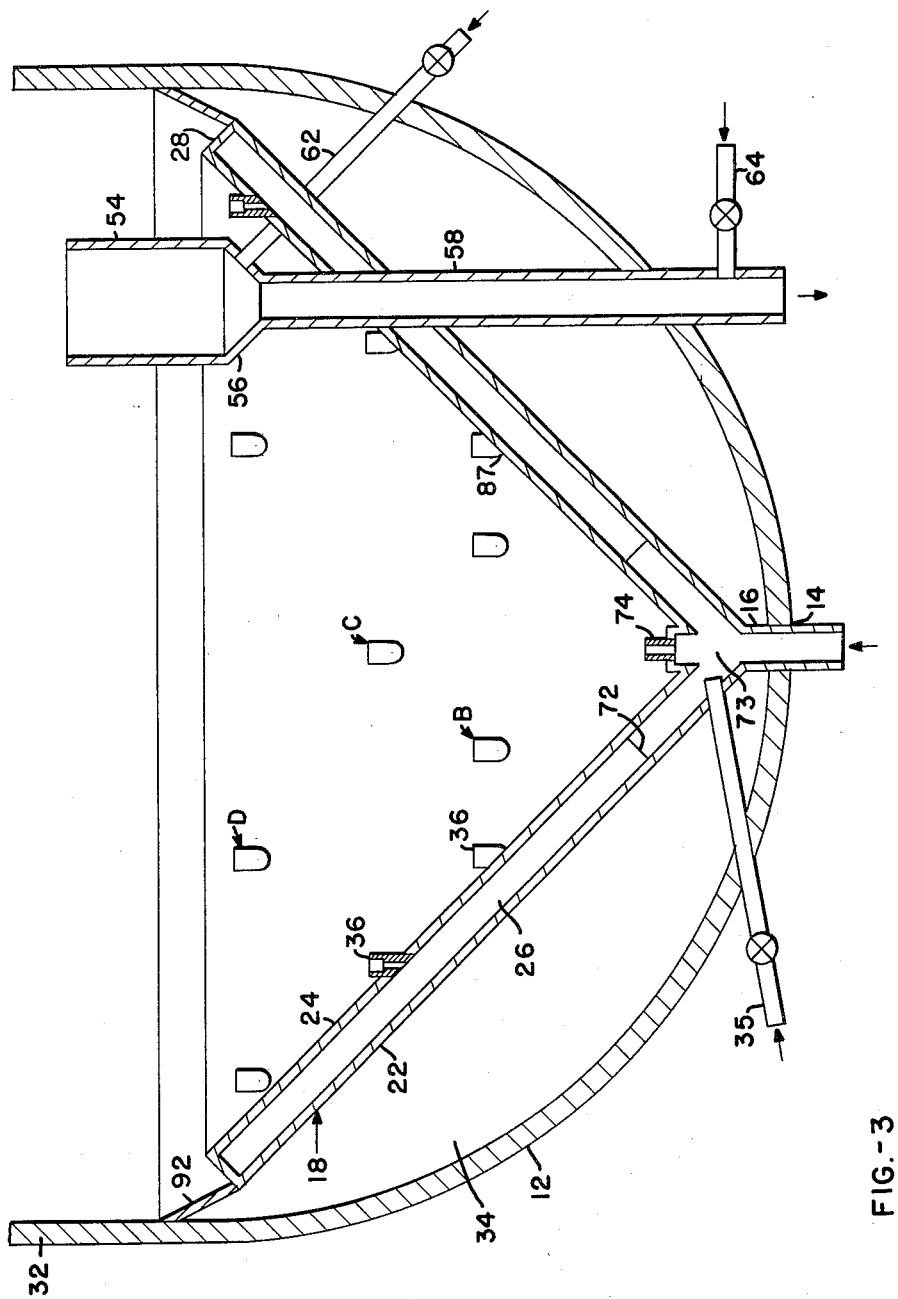

United States Patent Office 3,053,642
Patented Sept. 11, 1962

3,053,642
DISTRIBUTING GAS TO FLUIDIZED BEDS
Allan R. Huntley, Cranford, N.J., and Carl H. Huebschle, Cincinnati, Ohio, assignors to Esso Research and Engineering Company, a corporation of Delaware
Filed Aug. 5, 1958, Ser. No. 753,287
6 Claims. (Cl. 23—288)

This invention relates to apparatus for distributing gas feed to fluidized beds of finely divided solids.

It is important in all processes where gaseous fluids are contacted with finely divided contact or catalyst solids to obtain proper distribution of the gaseous feed into the fluidized solids bed. Distributing grids comprising horizontally arranged perforated plates have been used but in many cases the grids have not proved entirely successful or satisfactory.

In some of the arrangements there is too great a space or volume below the grid plate and in certain reactions this is a definite disadvantage as highly heated reactants are thermally decomposed or converted into less valuable products before reaching fluidized solids in the reaction zone.

In fluid catalyst hydroforming processes, a different type of grid was used than the horizontal grid to lessen or decrease the unused volume at the base of the reactor and this grid was made up of a number of upwardly directed tubes arranged as a divergent bunch or group at the bottom of the reactor. However, this form of distributor lacked ruggedness and occupied considerable reactor volume. This "porcupine" distributor is disclosed in French Patent 1,161,815, granted March 31, 1958.

The gaseous feed distributor of the present invention overcomes the problems of the previous distributors and provides a more rugged construction. With the design of the present invention, there is increased volume in the reactor made available for catalyst over designs in present use. In addition, there is reduced thermal cracking of hydrocarbon feed below the distributor grid.

The feed distributor of the present invention comprises a double cone grid member and is formed by a pair of spaced cones, apex down, and sealed at the outer circumference or outer edges to provide a space for receiving reactants and gas. The upper cone is provided with spaced openings or nozzles or nipples to provide a relatively high pressure drop full reactor diameter distributor. The openings or nozzles in the upper cone are selected to have proper size openings at the different vertical positions or levels to compensate for the difference in fluidized head of catalyst thereabove. The gaseous fluids enter the apex of the lower cone member, move through the annular space between the cone members and pass through holes or nozzles in the upper cone member which serves as a relatively high pressure drop full diameter distributor.

In the drawings:

FIG. 3 represents an enlarged detail in longitudinal section showing the double cone grid arranged in the bottom of a vessel.

The apparatus of the present invention is useful with processes where gaseous fluids are contacted with a dense, turbulent, fluidized solids in a bed and is especially adapted for use in fluid hydroforming processes. The apparatus will be specifically described in connection with a hydroforming process but the invention is not to be limited thereto as the invention may be used in fluid catalytic cracking, catalytic hydrogenation, desulfurization, adsorption, catalytic isomerization, partial oxidation of hydrocarbons, etc.

Figure 1:
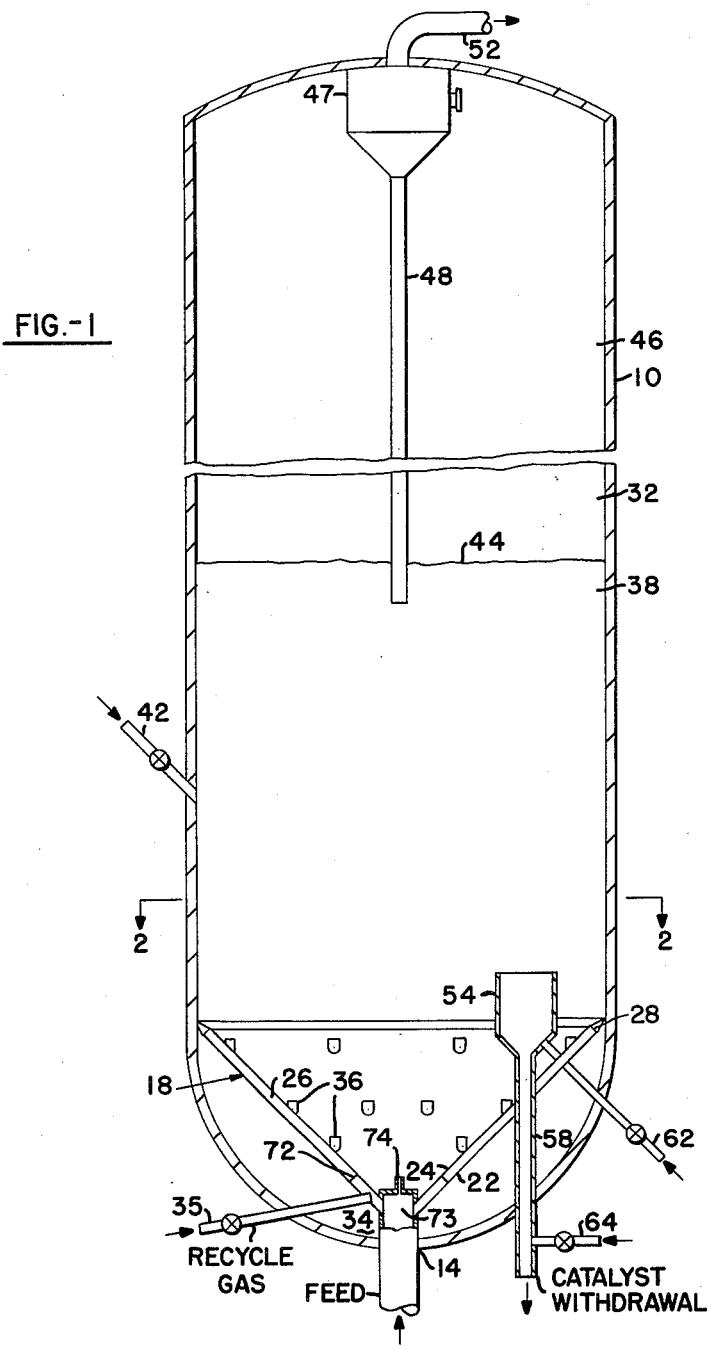
FIG. 1 represents a front elevation, partly in vertical cross section, of a reaction vessel diagrammatically showing a double cone grid distributor of the present invention.

Referring now to the drawing and to FIG. 1, the reference character 10 designates an elongated reaction vessel which is vertically arranged and is preferably cylindrical in shape. The vessel 10 is arranged to have a long height to container width ratio. The bottom 12 of vessel 10 is semispherical and is provided with a bottom opening 14 through which the inlet line 16 to the inverted double cone 18 extends.

The double cone distributor 18 will be more particularly described in connection with FIG. 3 but, generally, the distributor 18 is made up of two concentric inverted cones 22 and 24 with their apexes down and with the cones being parallel and spaced as at 26. The apexes of the cones are arranged in the bottom portion of vessel 10 and the cones flare upwardly and outwardly therefrom to the wall of the reactor vessel 10. The outer edges or circumferences of the cones 22 and 24 adjacent the wall of reactor 10 are sealed together as at 28 in any suitable manner and the outer edges or circumferences of the cones 22 and 24 are about the same diameter as the diameter of the vertical cylindrical section 32 of vessel 10. The space 34 between the bottom cone 22 and the bottom 12 of vessel 10 may be empty or filled with loose insulation or the like. The inlet line 16 leads into the space 26 between the cones 22 and 24 and terminates in the apex of cone 22. Another inlet line 35 shown horizontally arranged in FIG. 1 is provided with a valve and the line extends through rounded bottom 12 of reactor 10 and the lower portion of cone 22 near its apex and opens into space 26 between cones 22 and 24.

The upper cone 24 is provided with nozzles or openings 36 and these will be further described in connection with FIG. 3. A fluidized, turbulent, dense bed of solids indicated at 38 in FIG. 1 is supported on the cone distributor 18. Line 42 is provided for the introduction of finely divided catalyst into reactor 10. The line 42 is valved and opens into the lower portion of vessel 10 and into the dense fluid bed 38 through the wall of reactor 10. The dense fluidized bed of solids has a level indicated at 44 with a dilute phase 46 thereabove.

In the upper portion of the interior of reactor 10, dust separating means 47 such as one or more cyclone separators are provided for removal of entrained solids from the vaporous products passing overhead. The separated solids are returned to the dense bed 38 through dipleg 48 and the vaporous products substantially free of solids are withdrawn overhead through line 52 and further treated as desired. A vertically arranged withdrawal well 54 is provided adjacent one side of cone grid 18 for withdrawing spent solids from the dense fluidized bed 38. In a catalytic conversion process such as hydroforming, the spent catalyst is stripped, regenerated in an external regenerator, and then returned to the reactor 10. The withdrawal well 54 preferably extends above the cone distributor 18 and has a converging lower section 56 which leads to a smaller outlet line 58 which extends down through conical members 22 and 24 of the cone distributor 18 and down through the bottom wall 12 of reactor 10. One or more lines 62 are provided for introducing stripping gas such as steam into the bottom portion of well 54. One or more lines 64 are provided for introducing fluidizing gas into outlet line or standpipe 58.

Figure 2:
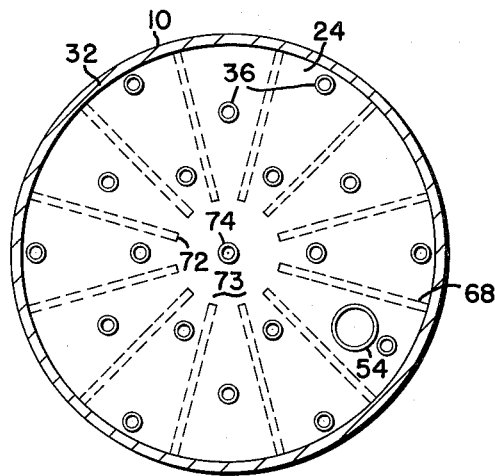
FIG. 2 represents a horizontal cross section taken substantially on line 2—2 of FIG. 1 with repeating sections omitted.

FIG. 2 is a top plan view of upper cone 24 showing generally the arrangement of nozzles or openings in upper cone member 24 for one size cone distributor but only part of the nozzles are shown. FIG. 2 also shows in dotted lines vertical baffles 68 which are radially arranged within space 26 between cone members 22 and 24. The ribs or baffles 68 extend from near the apexes of the cones as at 72 to the outer edges of circumferences of cone members 22 and 24 to in effect form cells which may be termed wedge-shaped. The baffles 68 are also shown in front elevation in FIGS. 1 and 3 but with the inner apex cut off. But cutting off the inner ends of baffles or ribs 68 a mixing space 73 is provided for mixing the naphtha and hydrogen gas when the invention is used in hydroforming. In the particular form of the invention shown in FIG. 2 one set of baffles 68 sets off one nozzle or opening 36, the next adjacent set of baffles sets off two nozzles or openings, the next adjacent set of baffles sets forth one nozzle or opening, etc. Different sized cone distributors will have different numbers of nozzles or openings but they will be symmetrically arranged similarly to the arrangement shown in FIG. 2.

The baffles 68 function to form cells or passageways to reduce backmixing or recirculation of the gases as they spread out from the apex of cone 22 as above described and also as strengthening members for the cone members 22 and 24. The baffles are secured in place in any suitable manner as by soldering, welding and the like to seal the baffles in place and form a reinforced structure. Lower cone member 22 is imperforate except for opening from line 16 at its apex.

Figure 4:
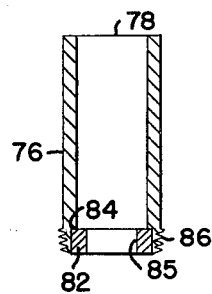
FIG. 4 represents a vertical section of one form of nozzle or nipple.

Referring now to FIG. 3 there is shown an enlarged detail of the bottom portion of a reactor having a double cone distributor 18 installed therein. FIG. 3 generally shows the distribution of the nozzles or openings for the particular form of apparatus shown. In FIG. 3 upper cone member 24 has a nozzle or nipple 74 at its apex and then three sets or rows of nozzles or nipples arranged one above the other at different levels. FIG. 4 shows an enlarged vertical section of one form of nipple or nozzle but other forms may be used.

As shown in FIG. 4 the nozzle or nipple 76 is a cylinder or tubular member open at its upper end 78 and provided at its lower end with a fixed orifice plate 82 which is fitted into a cutaway portion or shoulder 84 at the lower end of nipple 76. The orifice plate 82 has an opening 85 smaller than the internal diameter of the cylinder of the nipple 76. The outer surface of the nipple 76 at its lower end is screw threaded as at 86 to be removably mounted in upper cone member 24 by being screwed into threaded socket 87 diagrammatically shown in FIG. 3. Instead of being screwed into place the nozzles 76 may be welded or soldered in position in the openings in top cone 24.

The nozzles or nipples at the different levels have different sized openings in the orifice plate to compensate for the static fluid head at the different levels as will be pointed out in greater detail hereinafter. The nozzles or nipples extend for a short distance above the top conical member 24 and preferably the upper surface of conical member 24 is filled with a refractory cement (not shown) or the like to substantially the height of the nipples to give a smooth surface coextensive with the tops of the nozzles or nipples 36. The purpose of the nipples is to permit the gases to expand to a lower linear velocity before they enter the fluid solids bed so as to prevent a high rate of catalyst attrition. If attrition is no problem, or if it is desired, the nipples can be omitted but the orifice plates are retained.

In a commercial unit such as a hydroforming unit, for example, the temperature during reaction is relatively high and expansion problems must be met. In FIG. 3 there is shown an angular annulus 92 which extends at an angle from the outer edge of the distribution grid 18 to the wall 32 of the reactor. The annulus or ring 92 is attached or welded to the outer edge or circumference of the double cone grid 18 and extends to the wall of cylindrical portion of the reactor 10 to seal off the grid 18 to prevent any flow of solids from bed 38 to below grid 18.

A smaller unit will first be described to show that improved contacting is obtained with the present double cone distributor. The double cone distributor was about 5 feet in diameter to be positioned within a 5 foot reactor or contacting vessel 10. The double cones 22 and 24 are substantially parallel and separated by about 2 inches. The cone members 22 and 24 are at about an angle of about 45° with the horizontal. This angle may vary between about 30° and 60°. The nozzles or nipples in this form are arranged at four vertical levels with the bottom level comprising one nozzle 74 arranged at the apex of the top cone member 24. The next higher level or row of nozzles is indicated at "B" in FIG. 3 where on the same horizontal plane six nozzles or nipples are provided in upper cone member 24.

At the next higher level or row at "C" in FIG. 3 six nozzles or nipples are provided in upper cone member 24. The next and last higher level or row of nozzles or nipples is indicated at "D" in FIG. 3 and here again six nozzles or nipples are provided. The nozzles were arranged at one per about a square foot of surface of top cone 24. Each nozzle in this smaller arrangement was about 6 inches long and about 1.25 inches internal diameter.

In this particular arrangement the orifice diameter 85 in the single lowest nozzle or nipple 74 was 0.934 inch. The six nozzles at the next higher level "B" each had an orifice diameter 85 of about 0.915 inch. The nozzles or nipples in the next higher level of six nozzles indicated as at "C" each had an orifice diameter 85 of about 0.905 inch. The nozzles or nipples in the next higher level "D" each had an orifice diameter 85 of about 0.900 inch.

In this particular arrangement the gas was introduced only through line 16 at a rate to provide a superficial velocity in reactor 10 of about 0.8 ft./sec. However, the velocity may be varied between about 0.5 and 1.6 ft./sec. The solids comprised molybdena on alumina catalyst having an average median particle size of about 60 microns with most particles being between about 10 and 100 micron size and with 25% of 0–40 microns. The density of the dense, turbulent, fluidized bed or mixture 38 in reactor 10 was about 39 lbs./cu. ft. The height of the catalyst bed 38 above lowermost nozzle or nipple 74 was about 34 feet. There were 12 baffles or ribs 68 between cones 22 and 24.

The so-called "porcupine" distributor (French Patent 1,161,815), above referred to, has been used in a number of fluid hydroforming units. It gave excellent gas distribution, although it lacked ruggedness and occupied considerable reactor volume. The double cone distributor is an improvement over the "porcupine" distributor in three main respects:

(1) It is more rugged, due to the much shorter nozzles or nipples.

(2) It occupies much less volume in the reactor, therefore making possible a greater catalyst inventory in a given size vessel.

(3) Thermal degradation is less, even with the same volume inside the distributor itself, because the gases flow through a longer, narrower path. Recycling of gases within the distributor is therefore greatly reduced; the gas residence time distribution inside the double cone more nearly approaches that of plug flow (or piston flow).

These advantages are achieved without sacrificing the excellent quality of gas distribution shown by the "porcupine" distributor. The specific form of the invention just described above was tested under the conditions given using the so-called helium decay technique. This technique is a way of testing the quality of gas distribution, by measuring the gas residence time distribution at the top of the fluidized bed. The helium decay technique is briefly described below:

Helium is introduced with the fluidizing gas, upstream of the distributor, in an amount giving 0.1–1.0 vol. percent He. The helium flow is maintained constant until its concentration above the fluid bed is seen to be constant. Then the helium input is abruptly shut off, and the changing concentration at the top of the bed is recorded vs.

time. The slope of the normalized concentration vs. time graph, on a dimensionless semi-log plot, is a measure of the gas residence time distribution. A slope of 1 can be shown theoretically to result from a completely mixed fluid bed, while a slope of infinity results from piston flow, or plug flow, through the bed. Piston flow is ordinarily the most desirable residence time distribution in a fluid bed, though it can only be approached in actual practice.

The helium decay slopes above a fluid bed at a given set of operating conditions have been found to vary with the type of gas distributor or grid; poorer grids give lower slopes, and often their decay curves are rougher and more erratic. The helium decay tests on the double cone distributor of the specific form of the invention above described have shown slopes identical to those obtained with the "porcupine" distributor, i.e., 2.0. The decay curves in both cases were smooth and reproducible.

Permitting a 34 foot bed to defluidize in this apparatus did not plug the cone distributor 18. The cone 18 was readily cleared of settled catalyst in numerous tests.

In adapting the present invention to a commercial fluid hydroforming unit where the reactor has a diameter, for example, of about 22 feet and a dense bed of fluidized catalyst above the bottom of the top cone member 24 of about 45 feet, the number of nozzles or nipples is 285 and they are arranged at spaced intervals. The catalyst has a particle size in the range of about 0–150 microns with a major proportion between about 20 and 100 microns. The hydroforming catalyst is any suitable catalyst such as a group VI metal oxide, such as molybdenum oxide, chromium oxide, tungsten oxide, vanadium oxide, mixtures thereof, or platinum preferably dispersed on a support or carrier such as activated alumina, zinc aluminate spinel, silica-alumina, or the like. Preferred catalysts contain about 5–15% molybdenum oxide or about 0.1 to 5% platinum on a suitable carrier such as alumina.

The hydroforming reactor is operated at a temperature between about 850° F. and 1000° F. and at a pressure between about 50 and 500 p.s.i.g. Regeneration of the spent reactor catalyst is effected in a regeneration zone at substantially the same pressure as maintained in the reactor and at a temperature between about 1050° F. and 1200° F. The average residence time of the catalyst in the reactor 10 is from about 3 to 4 hours while the average residence time of the catalyst in the regenerator (not shown) is from about 5 minutes to 1 hour. The catalyst to oil ratio by weight introduced into the reactor 10 is between about 0.5 and 5.0. The superficial velocity of the gases and vapors passing up through the fluid bed in the hydroformer reactor is between about 0.6 and 1.2 feet per second.

The feed to a hydroforming unit may be a virgin naphtha, a cracked naphtha or the like having a boiling range between about 125° F. and 450° F. The naphtha feed is usually preheated to above about 800° F. but if the preheat temperature is too high and the time of residence of the heated feed in transfer or feed lines is too great, thermal cracking or degradation of the feed naphtha occurs and this results in a loss in yield of high octane gasoline product. In the present invention, the residence time of the preheated naphtha passing through line 16 is exceedingly short before the naphtha contacts the catalyst in the dense, turbulent bed 18 in reactor 10. The amount of hydrogen or hydrogen-rich gasoline introduced into the bottom of reactor 10 through line 35 is between about 3000 and 10,000 cubic feet per barrel of naphtha fed to the reactor 10 and the concentration of hydrogen may be between about 50 and 90% by volume. The hydrogen-containing gas is preheated to between about 1050° F. and 1200° F.

In use in hydroforming, the conical distributor 18 effectively improves gas residence time distribution of preheated naphtha before contacting the catalyst particles in the fluidized bed. In the double cone distributor of the present invention, nearly all the gas has nearly the same residence time inside the distributor. In the "porcupine" distributor, however, some of the gas has a much longer residence time and some of the gas has a shorter residence time, although the average residence time is about the same. Also, the shape of the double cone distributor increases catalyst volume in the reactor. The double cone distributor also provides gas distribution over substantially the entire reactor horizontal cross section.

The apparatus of the present invention is also useful in other reactions or contacting operations where finely divided solids are contacted with a gaseous fluid in a dense, fluidized, turbulent bed in a contacting zone. The apparatus may be used for catalytic hydrogenation or desulfurization of hydrocarbons, synthesis of hydrocarbons by reacting CO and $H_2$, hydrocracking of residual oils or shale oils or gas oils, catalytic isomerization, partial oxidation of hydrocarbons, etc.

In a modification, the grid member includes the concentric cone members, apex down, but instead of individual and separate openings in the upper cone, a series or rows of concentric pipe rings are used and embedded in the upper cone. The rings may be of different diameters. The upper surfaces of the pipe rings which are exposed to the fluidized bed are provided with slots or holes in such number as to give substantially uniform distribution of gas over the entire cross section of the vessel. These holes would normally also be the same diameter (about 1") and would be preferably directed upward for the gas.

The lower surfaces of the pipe rings, which are between the cone members, are provided with a series of holes or slots designed to have enough pressure drop to maintain approximately equal gas flow rates through each of the upper holes. That is, the bottom openings in the lower rows of pipe rings are larger than in the higher rows. Radial ribs between the cone members may be provided. The top cone member spans the surface between adjacent pipe rings.

What is claimed is:

1. An apparatus of the character described including in combination a cylindrical vessel adapted to contain a fluidized bed of solids therein, means for distributing fluidizing gas into the bottom portion of said vessel to fluidize the solids therein, said means including a double cone construction spaced from and arranged in the bottom portion of said vessel and having its apex near the bottom of said vessel and having its sides upwardly flared therefrom, said double cone construction at its largest diameter being of substantially the same diameter as said vessel and including an upper cone member and a lower cone member spaced apart and sealed together along the outer edges or circumferences to form a conical space, said lower cone member being imperforate, means for introducing a gaseous fluid into said apex and said conical space, said upper cone member being provided with a plurality of rows of nipples extending up from said upper cone member and arranged at different levels for introducing gaseous fluid from said conical space between said cone members into said vessel above said double cone construction, said nipples each having an orifice plate at its lower end and said nipples at the lower levels having larger sized orifices than the orifices at the higher levels to compensate for different fluid heads of pressure at the different levels.

2. An apparatus according to claim 1 wherein radial baffles or ribs are arranged in the space between said cone members to provide passageways for gaseous fluid being passed to said nipples.

3. An apparatus of the character described including in combination a vertically arranged cylindrical vessel having a semi-spherical bottom and adapted to contain a fluidized bed of solids therein, means for distributing fluidizing gas into the bottom portion of said vessel to fluidize solids therein, said means including a double cone construction having its apex in the bottom of said vessel and having its sides upwardly flared therefrom and spaced from said semi-spherical bottom, said double cone construction at its largest diameter being of substantially the same diameter as said vessel and including an upper cone member and a lower cone member in spaced relation and sealed together along their outer edges or circumferences to form a conical space, said bottom cone member being imperforate means including a line extending through the semi-spherical bottom and into said apex for introducing a gaseous fluid into said apex and said conical space, said upper cone member being provided with a plurality of rows of nipples extending up from said upper cone member and each provided with an orifice plate at its lower end, said nipples being arranged at different levels for introducing gaseous fluid from said conical space between said cone members into said vessel above said double cone construction and said nipples at the lower levels having larger sized orifices than the orifices at the higher levels to compensate for different fluid heads of pressure at the different levels.

4. An apparatus according to claim 3 wherein the orifice plates have larger openings at the lower levels than at the higher levels.

5. An apparatus of the character described including a vertically arranged vessel having a rounded bottom, means for distributing gaseous fluid into the bottom portion of said vessel, said means including a double cone construction with concentric spaced cones arranged in the bottom portion of said vessel and having their apexes down, said double cone construction at its largest diameter being of substantially the same diameter as said vessel, said double cone construction being spaced from said rounded bottom, a line extending through said rounded bottom and communicating with the bottom portion of said double cone construction for introducing fluidizing gas to the space between said concentric spaced cones, the lower cone being imperforate, the upper cone being provided with nipples having inserted orifice plates and arranged at different levels to effect substantially equal distribution of gaseous fluid to the bottom portion of said vessel, the orifice plates having larger openings at the lower levels than at the higher levels.

6. An apparatus according to claim 5 wherein radial baffles or ribs are arranged in the space between said cones to provide passageways for gaseous fluid being passed to said nipples.

References Cited in the file of this patent
UNITED STATES PATENTS

| | | |
|---|---|---|
| 1,971,852 | Goebels | Aug. 28, 1934 |
| 2,125,913 | Goebels | Aug. 9, 1938 |
| 2,292,897 | Neilson | Aug. 11, 1942 |
| 2,443,190 | Krebs | June 15, 1948 |
| 2,609,185 | Eisner | Sept. 2, 1952 |
| 2,628,158 | Wilcox | Feb. 10, 1953 |
| 2,700,592 | Heath | Jan. 25, 1955 |
| 2,740,752 | Anhorn | Apr. 3, 1956 |
| 2,773,015 | Yoder | Dec. 4, 1956 |
| 2,876,079 | Upchurch et al. | Mar. 3, 1959 |
| 2,886,419 | Orr et al. | May 12, 1959 |
| 2,934,411 | Purse | Apr. 26, 1960 |

FOREIGN PATENTS

| | | |
|---|---|---|
| 791,266 | Great Britain | Feb. 26, 1958 |

OTHER REFERENCES

German printed application (patentanmeldung) #H24558 IVa/12g, Nov. 29, 1956.